(12) United States Patent
Fujiwara et al.

(10) Patent No.: US 11,354,516 B2
(45) Date of Patent: Jun. 7, 2022

(54) INFORMATION PROCESSOR AND INFORMATION PROCESSING PROGRAM

(71) Applicant: TOYOTA JIDOSHA KABUSHIKI KAISHA, Toyota (JP)

(72) Inventors: Ryotaro Fujiwara, Suginami-ku (JP); Keiko Suzuki, Suginami-ku (JP); Makoto Honda, Sinagawa-ku (JP); Chikage Kubo, Chofu (JP); Ryota Okubi, Funabashi (JP); Takeshi Fujiki, Sinagawa-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 44 days.

(21) Appl. No.: 16/691,680

(22) Filed: Nov. 22, 2019

(65) Prior Publication Data

US 2020/0184010 A1    Jun. 11, 2020

(30) Foreign Application Priority Data

Dec. 5, 2018    (JP) .............................. JP2018-228220

(51) Int. Cl.
*G10L 15/22*    (2006.01)
*G06F 40/35*    (2020.01)
(Continued)

(52) U.S. Cl.
CPC ............ *G06F 40/35* (2020.01); *G06F 16/433* (2019.01); *G06Q 50/01* (2013.01); *G06V 30/274* (2022.01);
(Continued)

(58) Field of Classification Search
CPC ........ G06F 40/35; G06F 16/433; G06F 3/167; G06F 40/279; G10L 15/26; G10L 15/22; G10L 15/20; G10L 25/87; G10L 15/00; G10L 15/06; G10L 15/08; G10L 15/183; G10L 15/24; G10L 15/30;
(Continued)

(56) References Cited

U.S. PATENT DOCUMENTS

2013/0332162 A1* 12/2013 Keen ...................... G06F 40/10
                                                                    704/235
2015/0220992 A1* 8/2015 Brown ............... G06Q 30/0261
                                                                    705/14.58
(Continued)

FOREIGN PATENT DOCUMENTS

JP    2012-008969 A    1/2012
JP    2017-126861 A    7/2017
(Continued)

*Primary Examiner* — Qi Han
(74) *Attorney, Agent, or Firm* — Oblon, McClelland, Maier & Neustadt, L.L.P.

(57) ABSTRACT

An information processor includes a generation section that generates a specified character string on the basis of at least one of voice information corresponding to a content of speech detected by a voice detection section and vehicle information acquired from a vehicle. With this configuration, a user can input the specified character string, which is a hashtag, without an operation. Thus, compared to the related art in which the hashtag is generated on the basis of the operation (manual input) by the user, a burden on the user can significantly be reduced, and an input error can be prevented.

8 Claims, 4 Drawing Sheets

(51) Int. Cl.
  *G10L 15/20* (2006.01)
  *G10L 25/87* (2013.01)
  *G06Q 50/00* (2012.01)
  *G06F 16/432* (2019.01)
  *G10L 15/26* (2006.01)
  *G06V 30/262* (2022.01)

(52) U.S. Cl.
  CPC .............. *G10L 15/20* (2013.01); *G10L 15/22* (2013.01); *G10L 15/26* (2013.01); *G10L 25/87* (2013.01); *G10L 2015/228* (2013.01)

(58) Field of Classification Search
  CPC ...... G10L 2015/223–228; G06K 9/726; G06Q 50/01; H04L 51/32; G06N 20/00
  USPC .... 704/270.1, 270, 275, 231, 235, 250, 251, 704/257
  See application file for complete search history.

(56) References Cited

U.S. PATENT DOCUMENTS

2015/0244805 A1* 8/2015 Hampiholi ............... H04W 4/21
  709/217
2016/0269334 A1* 9/2016 Desouza Sana ..... G06Q 10/107

FOREIGN PATENT DOCUMENTS

JP 2018-077785 A 5/2018
WO 2015/059764 A1 4/2015

* cited by examiner

INFORMATION PROCESSOR AND INFORMATION PROCESSING PROGRAM

INCORPORATION BY REFERENCE

The disclosure of Japanese Patent Application No. 2018-228220 filed on Dec. 5, 2018 including the specification, drawings and abstract is incorporated herein by reference in its entirety.

BACKGROUND

1. Technical Field

The disclosure relates to an information processor and an information processing program.

2. Description of Related Art

In Japanese Patent Application Publication No. 2018-77785 (JP 2018-77785 A), a technique of allowing input of a hashtag without a burden on a user is disclosed.

SUMMARY

However, the technique disclosed in JP 2018-77785 A has a problem that the hashtag can only be input by operating an information processor.

The disclosure has been made in view of the above point and therefore has a purpose of obtaining an information processor that allows input of a specified character string as a hashtag without operating the information processor.

In order to solve the above problem, an information processor according to an aspect of the disclosure includes a generation section that generates a specified character string on the basis of at least one of voice information corresponding to a content of speech detected by a voice detection section and vehicle information acquired from a vehicle.

According to this aspect, the specified character string does not have to be input manually. Thus, compared to the related art, a burden on a user can be reduced.

In this aspect, the generation section may be configured to generate the specified character string corresponding to the content of the speech on the basis of the voice information, link data that is detected by a sensor provided in the vehicle with the generated specified character string, and upload the specified character string.

According to this aspect, the user who performs a character string search can check a situation of a point where the speech is made in further detail.

Another aspect of the disclosure can be realized as an information processing program.

The disclosure exhibits such an effect that the specified character string can be input without an operation.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

A description will hereinafter be made on a mode for carrying out the embodiment with reference to the drawings.

EMBODIMENT

Figure 1:
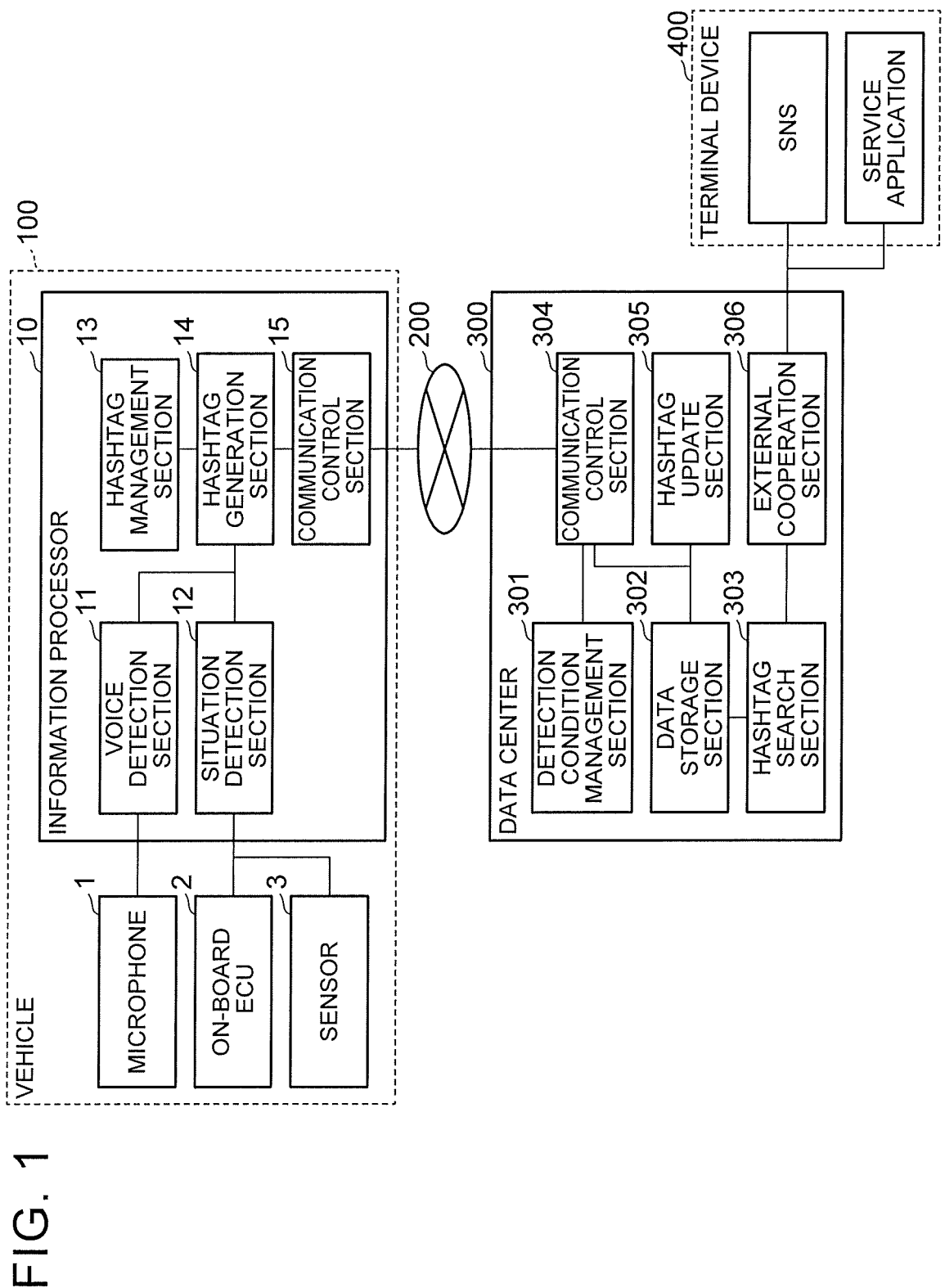
FIG. 1 is a diagram of a configuration of an information processor 10 according to an embodiment.

FIG. 1 is a diagram of a configuration of an information processor 10 according to an embodiment. A vehicle 100 is provided with a microphone 1, an on-board electronic control unit (ECU) 2 for vehicle control, a sensor 3, and the information processor 10. Hereinafter, the "vehicle 100" may simply be referred to as a "vehicle". The vehicle, to which the information processor 10 is applied, is not limited to an automobile but may be means of transport other than the automobile such as a motorcycle or a train.

The microphone 1 is a voice detector that detects voice generated by an occupant of the vehicle as an oscillatory waveform and outputs a signal indicative of the detected oscillatory waveform as voice information.

The on-board ECU 2 is, for example, a computer that controls an engine, a starter, a brake, a windshield wiper, and the like provided in the vehicle, and outputs vehicle information to a situation detection section 12. The vehicle information is information on an engine speed, an accelerator pedal operation amount (an accelerator pedal depression amount), a brake pedal operation amount (a brake pedal depression amount), a windshield wiper actuation state (stop, an operation speed, and the like), an indicated direction by a direction indicator, and the like. However, the vehicle information output from the on-board ECU 2 is not limited thereto.

The sensor 3 is a detector such as a Global Positioning System (GPS) sensor, an on-board camera, or an on-board radar. A type of the sensor 3 is not limited thereto. The sensor 3 outputs information that is detected by any of these sensors as sensor information to the situation detection section 12.

The information processor 10 is communicably connected to a data center 300 via a communication network 200. A terminal device 400 is connected to the data center 300. A service application for accessing a social networking service (SNS) website, such as Facebook®, Twitter®, or Instagram®, is installed in the terminal device 400. The terminal device 400 activates the service application and can thereby search for specified information by using a hashtag. For example, when a user searches "#heavy rain" on the terminal device 400, information linked to this hashtag is searched in the data center 300, and the searched information is provided to the terminal device 400. A description will hereinafter be made on the specific configuration of the information processor 10.

The information processor 10 is configured to generate the hashtag on the basis of the voice information, the vehicle information, the sensor information, and the like. The information processor 10 includes a voice detection section 11, the situation detection section 12, a hashtag management section 13, a hashtag generation section 14, and the communication control section 15.

The voice detection section 11 specifies information corresponding to a content of speech, for example, by analyzing a frequency component that is included in the voice information output from the microphone 1, and outputs the information to the hashtag generation section 14. A method for specifying the information corresponding to the content of the speech is known as disclosed in JP 2017-126861 A and the like. Thus, a description thereof will not be made.

The situation detection section 12 generates information on a driving situation and a peripheral situation of the vehicle on the basis of the vehicle information from the on-board ECU 2, the sensor information from the sensor 3, and the like, and outputs the information to the hashtag generation section 14. For example, in the case where the windshield wiper is operated at a low speed, there is a high possibility that it rains gently. In such a case, the situation detection section 12 collates the operation speed of the windshield wiper with a detection condition set by a detection condition management section 301, which will be described later. Then, when determining that it rains gently, the situation detection section 12 outputs the determination information as situation detection information. Meanwhile, in the case where the brake pedal is depressed abruptly, there is a high possibility that the vehicle stops abruptly due to a person or a car that jumps in at a blind intersection, for example. In such a case, the situation detection section 12 collates the brake pedal operation amount with the detection condition set in the detection condition management section 301. Then, when determining that a traffic accident is likely to occur at this location, the situation detection section 12 outputs the determination information as the situation detection information. Furthermore, in the case where the sensor 3 is the GPS sensor, the situation detection section 12 specifies a current location and an advancing direction of the vehicle on the basis of location information from the GPS sensor, and outputs information on the specified current location and the specified advancing direction as the situation detection information.

The hashtag management section 13 manages the hashtags by which a content of the voice, the vehicle information, and the like are abstracted so that the content of the voice from the voice detection section 11, the situation detection information from the situation detection section 12, and the like are easily searched by the hashtags. For example, in the case where the content of the voice is "it rains a little", "it drizzles", or the like, a creation rule of a hashtag "#gentle rain", by which the content of such speech is abstracted, is set in advance to facilitate a hashtag search. Meanwhile, in the case where the situation detection information corresponds to an operation state of the windshield wiper, a creation rule of a hashtag corresponding to the operation speed of the windshield wiper is set in advance, so as to be able to use the vehicle information for the hashtag search.

The hashtag management section 13 may include a hashtag list, and may be configured to output the hashtag corresponding to the content of the voice, the vehicle information, the sensor information, or the like by referring to this hashtag list. Alternatively, the hashtag management section 13 may be configured as a learning device that learns the content of the input voice and the input situation detection information so as to automatically generate the corresponding hashtag.

The hashtag list may be table information in which the contents of plural types of the voice and the plural hashtags, by which those contents of the voice are abstracted, correspond to each other, or may be table information in which plural pieces of the vehicle information and the plural hashtags, by which those pieces of the vehicle information are abstracted, correspond to each other, for example. More specifically, the hashtags such as "#bright" and "#afternoon sun" correspond to the contents of the voice such as "the reflected sunlight is so bright" and "it is the afternoon sun", and the hashtags such as "#dangerous" and "#intersection" correspond to the content of the voice such as "it is dangerous that a driver ignored a traffic light". In addition, the hashtags such as "#gentle rain" and "#sudden rain" correspond to the contents of the voice such as "it rains a little" and "it drizzles", and the hashtag such as "#torrential rain" corresponds to the contents of the voice such as "it is heavy rain" and "it suddenly becomes torrential rain".

Furthermore, the hashtags such as "#gentle rain" and "#sudden rain" correspond to the situation detection information indicating that the windshield wiper is operated at the low speed (the low-speed windshield wiper operation), and the hashtags such as "#downpour" and "#heavy rain" correspond to the situation detection information indicating that the windshield wiper is operated at the high speed (the high-speed windshield wiper operation). Moreover, the hashtags such as "#dangerous" and "#intersection" correspond to the situation detection information indicating that the brake pedal is depressed abruptly (the large brake pedal depression amount). Note that the contents in the hashtag list are not limited thereto.

In the case where the hashtag management section 13 is the learning device, for example, the hashtag management section 13 performs machine learning such as tutored learning, non-tutored learning, semi-tutored learning, intense learning, or deep learning. The machine learning is a technique for the computer to acquire learning capacity as of a human, and refers to a technique for the computer to autonomously generate an algorithm, which is required for determination such as data identification, from learning data retrieved in advance and to apply the algorithm to new data for prediction. As a machine learning method, a known method such as a regression analysis, K-means, bootstrap can be used. Thus, a detailed description thereof will not be made herein.

The hashtag generation section 14 is a generation section that generates and outputs the hashtag as a specified character string corresponding to the voice information, the situation detection information, and the like by referring to the hashtag management section 13. For example, in the case where the contents of the voice are "it rains a little", "it drizzles", and the like, the hashtags such as "#gentle rain" and "#sudden rain" are generated. Meanwhile, in the case where the "torrential rain" is determined on the basis of the situation detection information that is detected at the time when the stopped windshield wiper starts being operated at the high speed for a short time, the hashtag "#torrential rain" is generated.

The hashtag generation section 14 may be configured to generate the hashtag by combining the voice information and the situation detection information. For example, even in the case where the content of the voice is "it rains" or the like, the hashtag "#torrential rain" is generated when the "torrential rain" is determined on the basis of the situation detection information that is detected at the time when the stopped windshield wiper starts being operated at the high speed for the short time.

The hashtag generation section 14 may be configured to generate the hashtag "#bright" in the case where the content of the voice is "bright", and the data indicative of the location of the vehicle and the data indicative of the advancing direction of the vehicle at the time when such voice is detected are linked to the hashtag "#bright". In this case, the user who performs the hashtag search can confirm that the location where the speech "bright" is made at a particular location on an inbound lane, for example.

The hashtag generation section 14 may be configured to generate the hashtag "#bright" in the case where the content of the voice is "bright", and video data that is captured at the time when such voice is detected is linked to the hashtag "#bright". In this case, the user who performs the hashtag search can check a situation of a point where the user speaks "bright" in real time.

The hashtag generation section 14 may be configured to generate the hashtag "#rainbow" in the case where the content of the voice is "it is a rainbow", and still image data that is captured at the time when such voice is detected is linked to the hashtag "#rainbow". In this case, the user who performs the hashtag search can check appearance of the rainbow while suppressing an increase in data traffic.

The communication control section 15 is an interface that exchanges the information with the communication network 200 by wireless communication or wired communication. The communication network 200 is the Internet, a mobile terminal network, or the like. The communication control section 15 sends the hashtag, which is generated by the hashtag generation section 14, to the data center 300 via the communication network 200, receives the detection condition sent from the data center 300, and sends the detection condition to the situation detection section 12.

Next, a description will be made on a configuration of the data center 300. The data center 300 includes the detection condition management section 301, a data storage section 302, a hashtag search section 303, a communication control section 304, a hashtag update section 305, and an external cooperation section 306.

The communication control section 304 is an interface that exchanges the information with the communication network 200 by the wireless communication or the wired communication.

The detection condition management section 301 manages the detection condition for the situation detection section 12. For example, in the case where the windshield wiper is operated at the low speed, there is a high possibility that it rains gently. Thus, it is necessary for the situation detection section 12 to detect such a situation. For this reason, the plural detection conditions that correspond to types of the vehicle information, values of the vehicle information, and the like are set in the detection condition management section 301. These detection conditions are input to the situation detection section 12 via the communication control section 304, the communication network 200, and the communication control section 15. The detection condition for the detection condition management section 301 can be changed according to the type of the vehicle information or the like.

The plural hashtags, which are generated by the hashtag generation section 14, are stored in the data storage section 302. The hashtag search section 303 refers to the data storage section 302 and reads the hashtag searched by the terminal device 400. The hashtag update section 305 has a function of updating the information that is stored in the hashtag management section 13. The external cooperation section 306 is an interface that exchanges the information with the terminal device 400 by the wireless communication or the wired communication.

Figure 2:
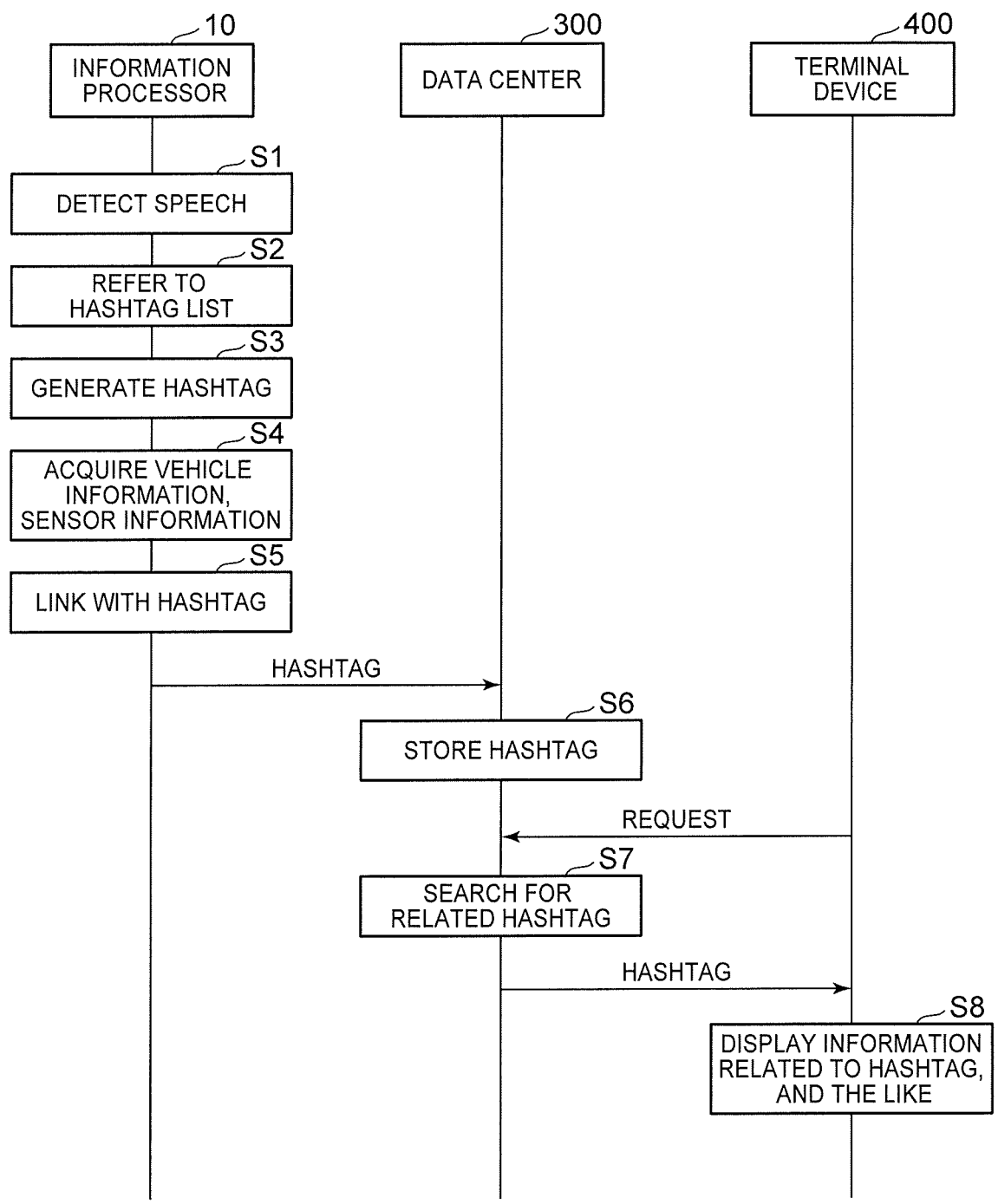
FIG. 2 is a flowchart for illustrating a first operation example of the information processor 10.

Next, a description will be made on first operation of the information processor 10 with reference to FIG. 2. FIG. 2 is a flowchart for illustrating a first operation example of the information processor 10. When the voice detection section 11 detects the content of the speech (step S1), the hashtag generation section 14 refers to the hashtag list stored in the hashtag management section 13, for example (step S2), and generates the hashtag corresponding to the content of the speech (step S3).

When at least one of the vehicle information and the sensor information is acquired (step S4), the situation detection information, for example, the data on the location and the advancing direction of the vehicle at the time when the voice is detected is linked to the hashtag generated in step S3, and is sent to the data center 300 (step S5). The data center 300 that receives this hashtag stores the hashtag in the data storage section 302 (step S6). When the hashtag search is performed on the terminal device 400, a search for the related hashtag is started (step S7), and the hashtag as a search result is sent to the terminal device 400. The information related to this hashtag is displayed on the terminal device 400 (step S8).

Figure 3:
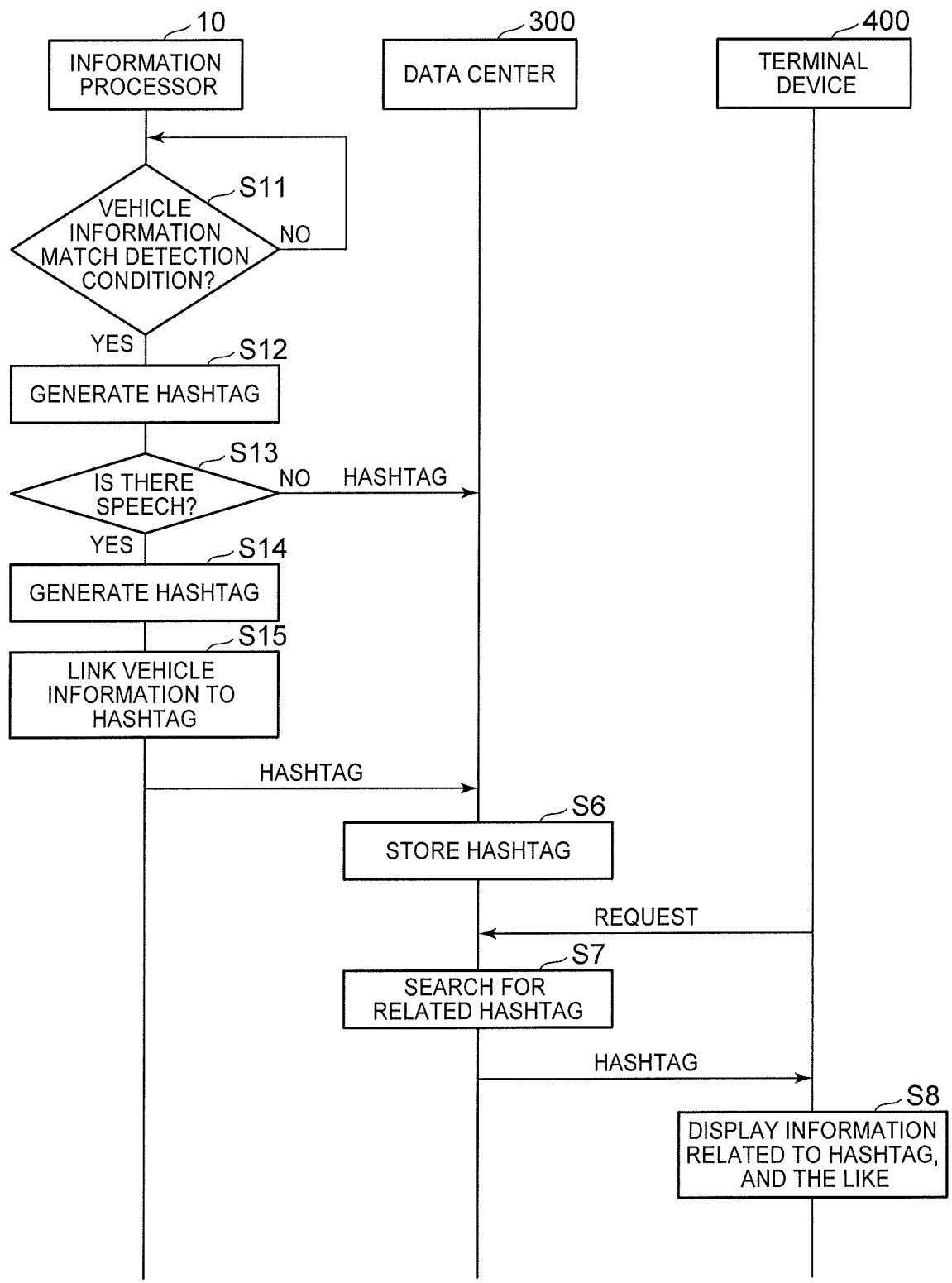
FIG. 3 is a flowchart for illustrating a second operation example of the information processor 10.

Next, a description will be made on second operation of the information processor 10 with reference to FIG. 3. FIG. 3 is a flowchart for illustrating a second operation example of the information processor 10. In step S11, it is determined whether the vehicle information, which is detected by the situation detection section 12, matches the detection condition. If the vehicle information matches the detection condition (step S11, YES), the hashtag generation section 14 refers to the hashtag list, which is stored in the hashtag management section 13, for example, and generates the hashtag corresponding to the vehicle information (step S12).

In step S13, it is determined whether the content of the speech is detected by the voice detection section 11 before a lapse of a certain time from a time point at which the vehicle information is detected, for example. If the content of the speech is not detected (step S13, NO), the hashtag that is generated in step S12 is sent to the data center 300 and is stored in the data storage section 302 of the data center 300.

If the content of the speech is detected (step S13, YES), the hashtag generation section 14 refers to the hashtag list, which is stored in the hashtag management section 13, for example, and generates the hashtag corresponding to the content of the speech (step S14). In step S15, the situation detection information, for example, the data on the location and the advancing direction of the vehicle at the time when the voice is detected is linked to the hashtag generated in step S14, is sent to the data center 300, and is stored in the data storage section 302 of the data center 300. The processing operation in step S6 onward is the same as the processing operation illustrated in FIG. 2, and thus the description thereon will not be repeated.

The operation examples of the information processor 10 are not limited to these. For example, it may be configured that, even in the case where the vehicle information is detected at the time when the voice detection section 11 detects the content of the speech, only the hashtag corresponding to the content of the speech is sent to the data center 300. Also, with such a configuration, the hashtag does not have to be input manually. Thus, compared to the related art, a burden on the user can be reduced.

Figure 4:
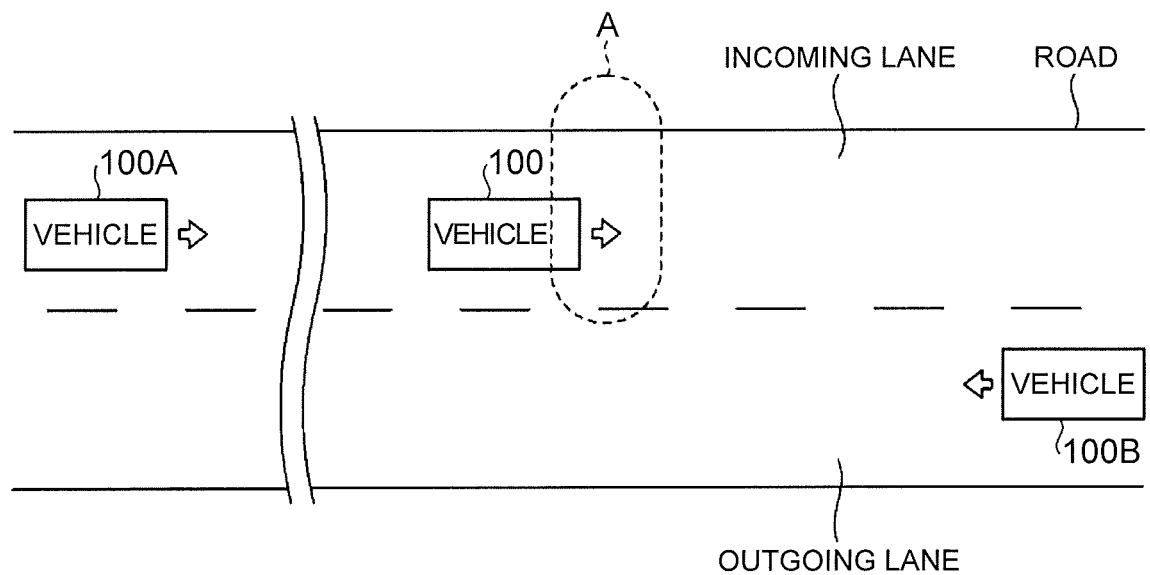
FIG. 4 is a view for illustrating a situation where a hashtag is generated.

FIG. 4 is a view for illustrating a situation where the hashtag is generated. The vehicle 100 and a vehicle 100A, which is located several kilometers behind the vehicle 100, currently travel on an incoming lane of a road illustrated in FIG. 4 while a vehicle 100B currently travels on an outgoing lane of the same road. Such a situation is assumed that a driver of the vehicle 100 feels bright at the time when the vehicle 100 that travels on the incoming lane passes a particular location A due to the sunlight reflected by a nearby building window shining on the particular location A.

In the case where the driver of the vehicle 100 speaks "bright" at the time of passing the particular location A, the hashtag "#bright" is generated on the basis of the content of the speech. In addition, since a traveling direction and the current location of the vehicle are detected on the basis of the sensor information output from the sensor 3 such as the GPS, information on the traveling direction and the current location of the vehicle is linked to the hashtag "#bright". The thus-generated hashtag is stored in the data storage section 302. In the case where an occupant of the vehicle 100A that travels behind the vehicle 100 uses the hashtag "#bright" to search for the related information, the occupant can acknowledge that there is the bright location ahead before the vehicle 100A arrives at the particular location A. Meanwhile, the vehicle 100B that travels on the outgoing lane travels on the different lane from the travel lane of the vehicle 100. Thus, even in the case where an occupant of the vehicle 100B uses the hashtag "#bright" to search for the related information, the same information as that browsed by the occupant of the vehicle 100A is not provided for the occupant of the vehicle 100B.

In this case, the information processor 10 may be configured to capture an image of the vicinity of the particular location A by using the on-board camera, associate the captured data with the hashtag "#bright", and upload the captured data to the data center 300 when the speech "bright" is made. As a result, the occupant of the following vehicle 100A can check scenery of the particular location A, and thus can check the situation in further detail.

In addition, the information processor 10 may be configured to associate the captured data, which is captured several tens of seconds before and after the speech "dangerous" is made, with the hashtag "#dangerous" and upload the captured data to the data center 300 when the speech "dangerous" is made. As a result, the user who performs the hashtag search can check the situation of the blind intersection where the traffic accident is likely to occur, and the like in detail.

Furthermore, in the case where the content of the voice is the "torrential rain", the video data that is captured at the time when this voice is detected may be linked to the hashtag "#torrential rain", or sound collected by the microphone 1 (sound of the rain hitting the vehicle) may be linked to this hashtag. With such a configuration, the user who performs the hashtag search can check a condition of the torrential rain in real time.

Figure 5:
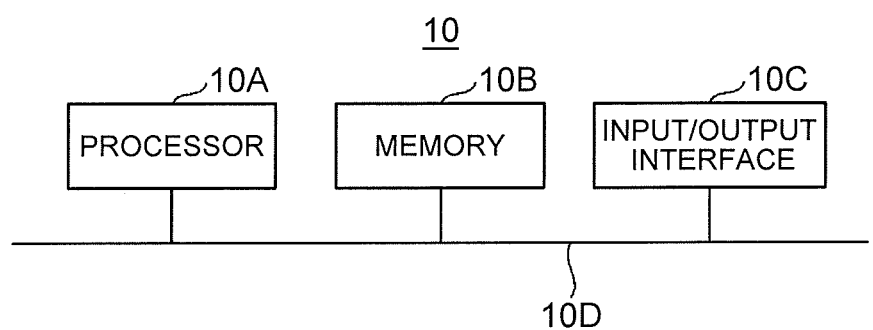
FIG. 5 is a diagram of a hardware configuration example for realizing the information processor 10 according to the embodiment.

FIG. 5 is a diagram of a hardware configuration example for realizing the information processor 10 according to the embodiment. The information processor 10 can be realized by: a processor 10A such as a central processing unit (CPU) or system large scale integration (LSI); memory 10B including random access memory (RAM), read only memory (ROM), and the like; and an input/output interface 10C. The processor 10A may be arithmetic operation means such as a microcomputer or a digital signal processor (DSP). The processor 10A, the memory 10B, and the input/output interface 10C are connected to a bus 10D and can mutually exchange the information via the bus 10D. The input/output interface 10C exchanges the information with the hashtag generation section 14 and the communication network 200. In the case where the information processor 10 is realized, a program for the information processor 10 is stored in the memory 10B, and this program is executed by the processor 10A. In this way, the voice detection section 11, the situation detection section 12, the hashtag management section 13, the hashtag generation section 14, and the like of the information processor 10 are realized.

The information processor 10 according to this embodiment is not limited to a navigation system, a voice recognition system, or the like provided in the vehicle, and may be a smartphone, a tablet terminal, a mobile phone, a personal computer, or the like.

As it has been described so far, the information processor 10 according to the embodiment includes a generation section (the hashtag generation section 14) that generates the specified character string on the basis of at least one of the voice information corresponding to the content of the speech detected by the voice detection section and the vehicle information acquired from the vehicle. It is difficult to operate equipment during driving of the vehicle, and it is further difficult to look at the information displayed on the equipment. However, with the information processor 10, the hashtag as the specified character string can easily be input without the operation. Thus, compared to the related art in which the hashtag is generated on the basis of the operation (manual input) by the user, the burden on the user can significantly be reduced, and an input error can be prevented.

The hashtag generation section 14 may be configured to generate the specified character string, which corresponds to the content of the speech, on the basis of the voice information, link the data detected by the sensor provided in the vehicle with the generated specified character string, and upload the hashtag. With such a configuration, the user who performs the hashtag search can check the situation of the location where the speech is made in further detail.

The information processor program according to this embodiment causes the computer to execute the step of generating the specified character string on the basis of at least one of the voice information corresponding to the content of the speech detected by the voice detection section and the vehicle information acquired from the vehicle. With the information processor program according to this embodiment, compared to the related art in which the hashtag is generated on the basis of the operation (the manual input) by the user, the burden on the user can significantly be reduced, and the input error can be prevented.

The configuration that has been described in the embodiment so far is an example of the disclosure and can be combined with another known technique. The configuration can partially be omitted or modified within the scope that does not depart from the gist of the disclosure.

What is claimed is:

1. An information processor comprising:
    a processor programmed to:
        generate, on the basis of machine learning, a specified character string on the basis of both voice information corresponding to a content of detected speech and vehicle information acquired from a vehicle including generating the specified character string corresponding to the content of the speech on the basis of the voice information;
        link data, detected by a sensor provided in the vehicle at a time when the detected speech was detected, with the generated specified character string after the generated character string is generated on the basis of both the voice information and the vehicle information, and
upload the specified character string.

2. The information processor according to claim 1, wherein the vehicle information includes vehicle state information.

3. The information processor according to claim 1, wherein the processor is programmed to generate the specified character string such that it includes a character that is common to all specified character strings generated on the basis of both the voice information and the vehicle information.

4. The information processor according to claim 3, wherein the character that is common to all the generated specified character strings is #.

5. The information processor according to claim 1, wherein the data detected by the sensor is different from the vehicle information acquired from the vehicle.

6. A system comprising:
the information processor according to claim 1; and
the vehicle, wherein the vehicle includes a plurality of sensors configured to generate the vehicle information.

7. A system comprising:
the information processor according to claim 1; and
the vehicle,
wherein the vehicle includes an electronic control unit configured to generate the vehicle information.

8. A non-transitory computer readable medium storing an information processing program that when executed causes a computer to execute a method, the method comprising:
generating, on the basis of machine leaning, a specified character string on the basis of both voice information corresponding to a content of detected speech and vehicle information acquired from a vehicle including generating the specified character string corresponding to the content of the speech on the basis of the voice information;
linking data, detected by a sensor provided in the vehicle at a time when the detected speech was detected, with the generated specified character string after the generated character string is generated on the basis of both the voice information and the vehicle information, and
uploading the specified character string.

* * * * *